United States Patent
Pearce et al.

[11] 3,894,906
[45] July 15, 1975

[54] APPARATUS FOR MAKING TIRE BREAKERS

[75] Inventors: Thomas H. Pearce, Niles, Mich.;
Larry C. Frazier, Sun City, Ariz.

[73] Assignee: National-Standard Company, Niles, Mich.

[22] Filed: June 1, 1973

[21] Appl. No.: 366,239

[52] U.S. Cl. ............... 156/440; 28/1 CL; 156/123;
156/126; 156/128 I; 156/128 T; 156/405 P;
156/298; 156/302; 156/304; 156/512;
156/517; 156/519; 56/560; 56/562
[51] Int. Cl.² B29H 9/04; B29H 17/28; B65H 51/00
[58] Field of Search ........ 156/405 P, 123, 133, 126,
156/512, 517, 519, 398, 128, 128 I, 128 T,
264, 265, 440, 560, 562, 296, 297, 298, 302,
304; 28/1 CL

[56] References Cited
UNITED STATES PATENTS

| | | | |
|---|---|---|---|
| 1,714,799 | 5/1929 | Midgley | 156/512 |
| 2,231,853 | 2/1941 | MacDonald et al. | 156/512 |
| 3,156,027 | 11/1964 | Wellman | 28/1 CL |
| 3,666,598 | 5/1972 | Christie et al. | 156/361 |
| 3,694,283 | 9/1972 | Cooper et al. | 156/512 |
| 3,802,982 | 4/1974 | Alderfer | 156/128 T |

FOREIGN PATENTS OR APPLICATIONS

629,645 10/1961 Canada............................ 156/128 I

*Primary Examiner*—Clifton B. Cosby
*Attorney, Agent, or Firm*—Johnson, Dienner, Emrich & Wagner

[57] ABSTRACT

A tire breaker is formed on a continuously rotating work belt by laying a continuous series of cut length of cord in a side-by-side relation until a complete layer is made. The end of a spool of cord is divided into equal-length segments and the segments are fed sequentially to a cord laying means which operates in a timed relation with the continuous advancement of the work belt.

10 Claims, 23 Drawing Figures

APPARATUS FOR MAKING TIRE BREAKERS

BACKGROUND OF THE INVENTION

The common practice in the tire building art today is to make automobile breakers by the so-called "creel and calendar system." Briefly this system consists of laying a plurality of parallel adjacent cords from a number of spools onto a rubber sheet and then the rubber sheet is bias cut to form a breaker strip.

The creel and calendar system is a relatively expensive and time consuming process requiring the use of heavy inflexible equipment. The object of this invention is to provide a new system of making tire breakers which will greatly reduce the amount of scrap and will eliminate the need for heavy inflexible equipment. This invention uses a single cord laying device in place of the massive calendar and uses a small single wire cutter instead of prior art usage of a large expensive cutter.

SUMMARY OF THE INVENTION

A system for fabricating a tire breaker on a rotating endless work belt in which a cord laying means lays a continuous series of cut lengths of cord in a side-by-side relation diagonally on the work belt. A spool of cord is cut into equal length segments and these segments are sequentially fed to the cord laying means.

Centering means are provided for laterally and rotatably moving the work belt relative to the cord laying means in order that a second breaker layer which is narrower in width may be applied over the first layer in a centered relation with the wider first layer. The cord lengths in the second layer are cut into shorter lengths as compared to the length of the first layer.

DESCRIPTION OF DRAWINGS

For a better understanding of this invention, reference may be made to the accompanying drawings, in which.

DESCRIPTION OF PREFERRED EMBODIMENT

Figure 1:
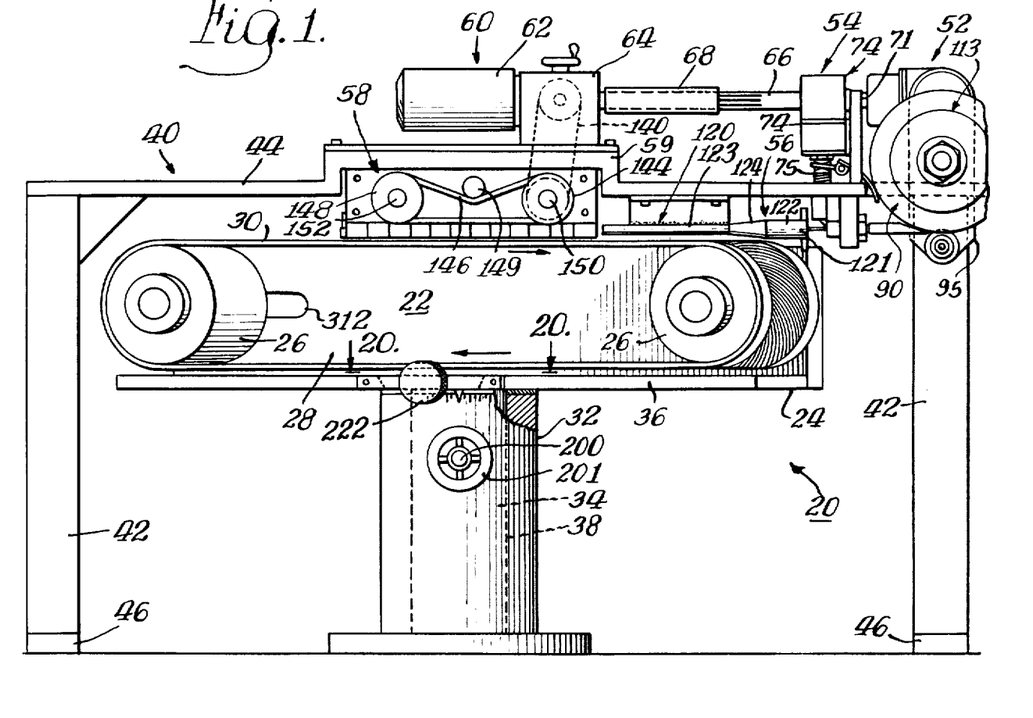
FIG. 1 is a front elevational view of the preferred embodiment of this invention.
Figure 2:
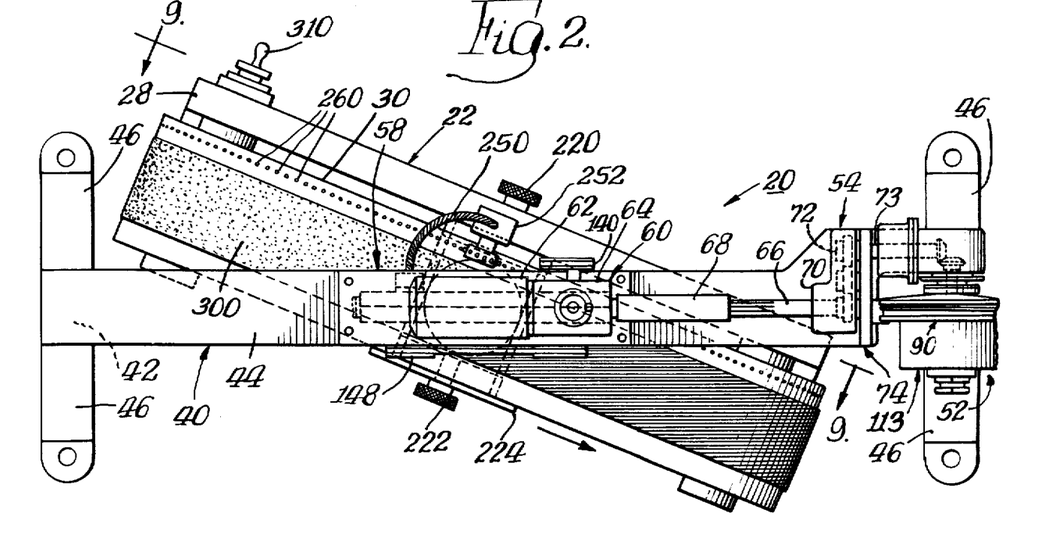
FIG. 2 is a top plan view of FIG. 1.

Referring to FIGS. 1 and 2, there is shown a machine for forming tire breakers which embody the principles of this invention and is generally designated by the reference numeral 20. The breaker is formed on a work belt assembly 22. The work belt assembly 22 has a L-shaped frame member 24, and a pair of pulleys 26 are mounted in a spaced-apart relation on the vertical wall 28 of the L-shaped frame 24. An endless work belt 30, which is made of an inextensible material such as metal, is trained about the spaced pulleys 26. The work belt assembly 22 is rotatably mounted on an upstanding pedestal 32 by means of a cylindrical support member 34 which extends downwardly from the center of the horizontal plate 36 of L-shaped frame 24 and is rotatably received in the cylindrical bore 38 of the pedestal 32.

The apparatus for feeding and laying the cord onto the work belt is mounted on a main frame 40 which is constructed of a pair of vertical legs 42 spaced apart a distance greater than the length of the L-shaped frame 24 and a bridge member 44 supported between the upper ends of the vertical legs 42. The lower ends of the legs 42 are provided with forward and rearward extending feet 46 which may be mounted to the floor surface supporting the tire breaking machine 20.

As illustrated in FIG. 1, the cord is fed from a spool (not shown) through a metering assembly 52 and cutting assembly 54. The cutting assembly 54 severs the cord into predetermined lengths and these lengths are fed by a cord feeding assembly 56 into a cord laying assembly 58. All of the cooperating assemblies in this invention are driven by a common drive means 60 comprising an electric motor 62 and output gear box 64.

As shown in FIGS. 1 and 2, the drive for cutter assembly 54 is taken off of output shaft 68 of gear box 64 by spline 66. The outer end of spline 66 (FIGS. 3–4) extends through a cutter assembly housing 70 and terminates within an opening in vertical mounting post 71. Cutter assembly housing 70 which is mounted on post 71 encloses a one-to-one gear unit 72 (FIG. 2) which provides an offset output shaft 73 for the metering assembly 52.

Cutter assembly 54 includes a solenoid operated cutter unit 74 having a downwardly extending plunger 75. An elongated knife 76 is carried by plunger 75 and is vertically guided by a block 77 having a vertical slot through which the lower portion of the knife is slidably received. A spring 78 urges the plunger 75 upwardly when the solenoid is deenergized.

Figures 6, 7:
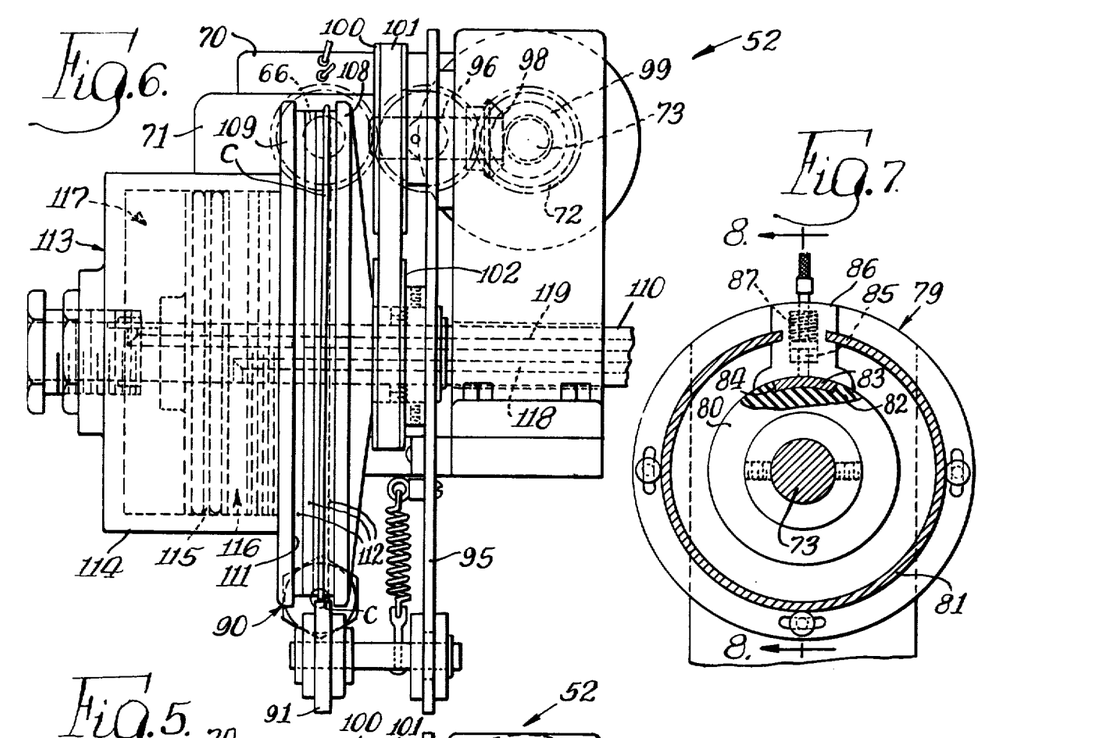
FIG. 6 is an end view of the metering assembly taken from the right side of FIG. 3 and showing the relative position of parts with the feed wheel in the small diameter position.
FIG. 7 is a cross sectional view taken along the line 7—7 of FIG. 4 and looking in the direction of the arrows.
Figure 8:
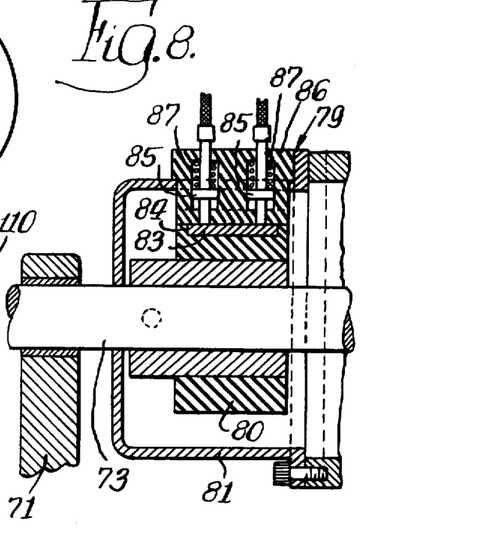
FIG. 8 is a cross sectional view of FIG. 7 taken along the line 8—8 and looking in the direction of the arrows.

Referring to FIGS. 7 and 8, the switch means 79 for operating the solenoid 74 in timed relation to the operation of the cord laying assembly is depicted. Switch means 79 comprises a switch contact member 80 fixed to offset output shaft 73 and rotating within switch housing 81. Switch contact member 80 is made of a circular insulating disc 82 having an arcuate contact element 83 in a cut-out 84 formed in its outer peripheral surface. A pair of spaced brushes 85 are seated in recesses formed in an insulated brush holder 86 and urged into contact with disc 82 by springs 87 such that a current path is provided between them upon their engagement with arcuate contact 83.

As depicted in FIGS. 3–6, the metering assembly 52 employs a large diameter feed wheel 90 which cooperates with a spring-biased pressure roller 91 to deliver the cord C through a flexible tubular member 92. The fixed end of tubular member 92 (FIG. 4) is secured in a passageway 93 formed through a vertical frame arm 94 in alignment with the cord feeding assembly 56. The cord C exiting from passageway 93 crosses the cutting path of knife 76.

Feed wheel 90 and pressure roller 91 are rotatably mounted on an elongated plate 95 which is pivotally mounted at its upper end by shaft 96. A spring 97 is connected between the lower end of the plate 95 and the frame arm 94 to urge the plate 95 towards the vertical position. Shaft 96 has a bevel gear 98 on its outer end which meshes with bevel gear 99 on the outer end of shaft 73 to drive pulley 100, which through endless chain 101 drives the feed roller 90 by turning its associated pulley 102.

The reason the feed wheel 90 and pressure roller 91 are mounted on a pivotal plate 95 is due to the fact that it is desirable to provide a temporary interruption in feeding the cord past the cutter knife 76 during the cutting operation without causing any change in the speed of metering the cord C by metering assembly 52. This interruption is effected by a roller displacement member 103 which is pivotally supported on pin 104, and includes a rigid arm 105 extending through a slot 106 in solenoid plunger 75 and a spring arm 107 adapted to engage the peripheral surface of wheel 90 upon the downward movement of solenoid plunger 75.

Figure 5:
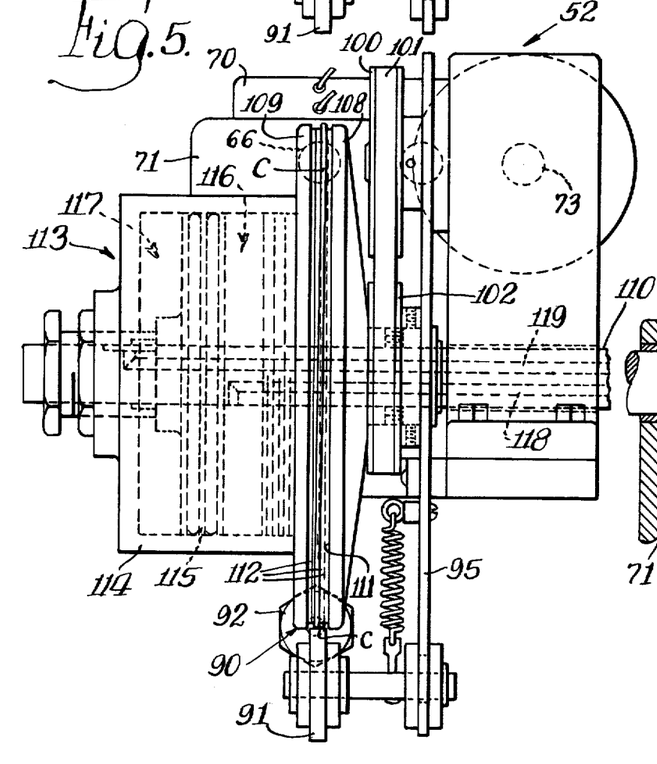
FIG. 5 is an end view of the metering assembly taken from the right side of FIG. 3 and showing the relative position of the parts with the feed wheel in the enlarged diameter position.

To vary the speed of the metering assembly 52 to provide different cut lengths of cord, means are provided for selectively changing the diameter of feed wheel 90. Referring to FIGS. 5–6, it is seen that feed wheel 90 is constructed of two disc members 108 and 109 in which disc 108 is fixed on shaft 110. Disc 109 is slidably mounted on shaft 110 and telescopes over the disc 108 to provide an axpandable and contractible annular groove 111. A plurality of compressible annular ring members 112 are disposed in side-by-side relation across annular groove 111, and these compressible ring members 112 when squeezed together expand radially to increase the effective diameter of feed wheel 90.

Selective displacement of the slidable disc 109 is accomplished by a fluid drive means 113. A cup-shaped housing 114 is secured to the outside surface of disc 109 and a piston 115, which is fixed to shaft 110, is disposed within the cup-shaped housing 114 to define first and second chambers 116, 117. A first fluid conduit 118 terminating within chamber 116 extends through the center of shaft 110 for introducing a fluid under pressure to move disc 109 towards disc 108 to the position of FIG. 5. Similarly, a second fluid conduit 119 terminating within chamber 117 extends out through shaft 110 for introducing fluid under pressure to move disc 109 away from disc 108 to the position of FIG. 6.

Figure 3:
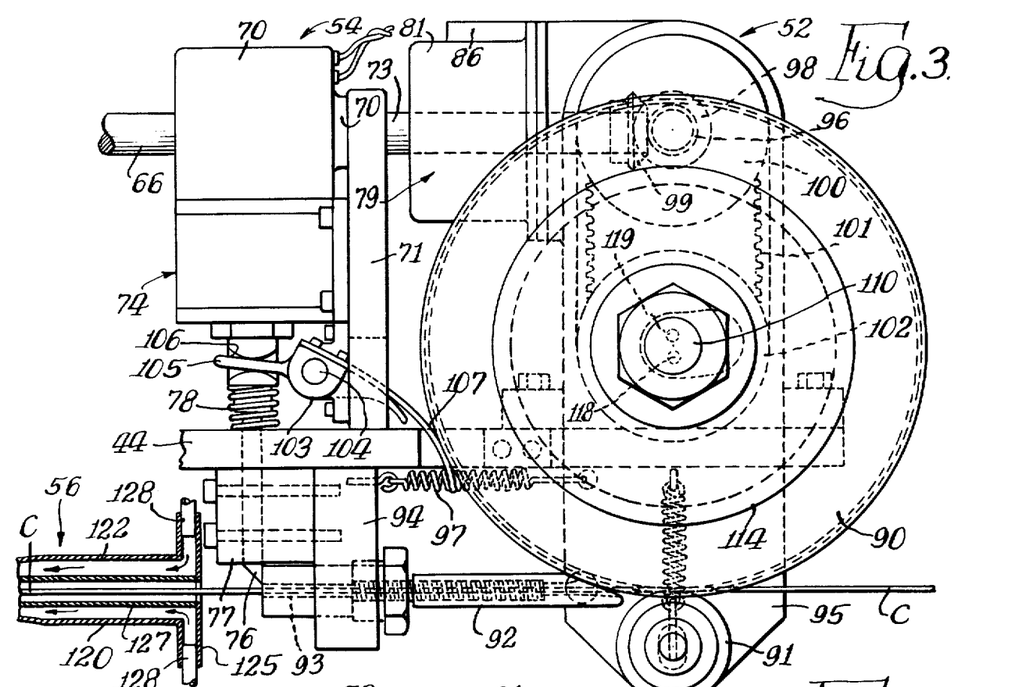
FIG. 3 is a sectional view of the cord cutting assembly and cord metering assembly.
Figure 4:
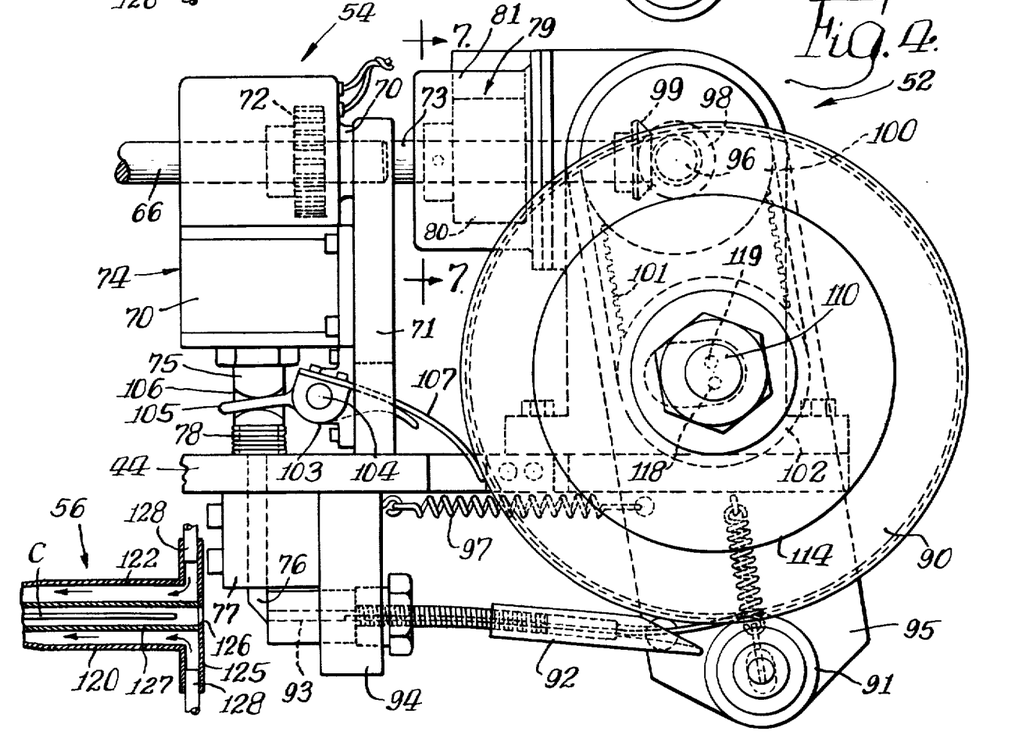
FIG. 4 is a sectional view of the cord cutting assembly and cord metering assembly showing the relative position of parts during the cord cutting operation.

The cord feeding assembly 56 employs a venturi tube 120 (FIG. 1) to shoot the cut length of cord forwardly into the cord laying device 58. The venturi tube 120 has an elongated body 121 having a large diameter rearward portion 122 relative to its forward portion 123 and an intermediate conical portion 124. The rear end wall 125 (FIG. 3) of the body portion 121 is closed except for a small central aperture 126 through which the cord passes. Extending forwardly from the rear end wall 125 is an internal cylindrical wall 127 as seen in FIG. 3 concentric with the body portion 121 which extends into the intermediate conical portion 124. A pair of inlet ports 128 are formed adjacent the rearward end wall 125 at diametrically opposite locations to provide a means for introducing pressurized air into the body portion 121 as indicated by the arrows in FIG. 4. Because the elongated body portion tapers to a relative small diameter at its forward end 123, this pressurized air produces a large propelling force on the cord C which shoots it forwardly into the cord laying device 58.

Figure 10:
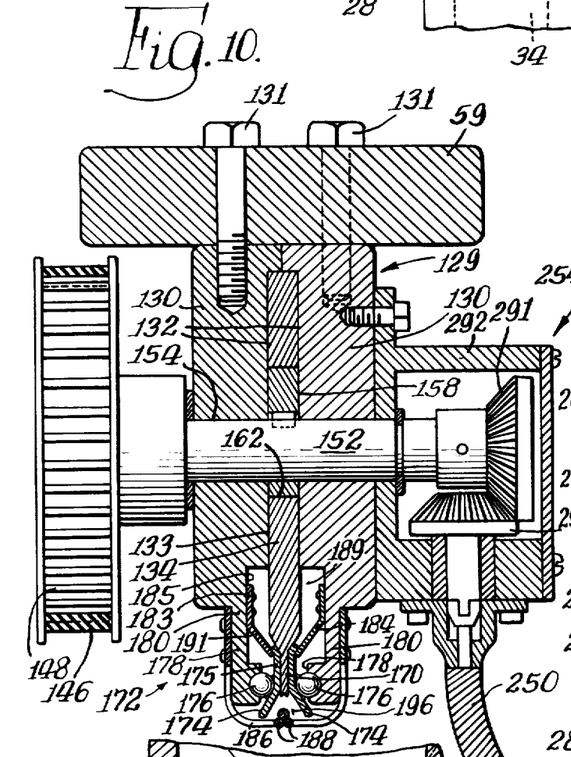
FIG. 10 is a cross sectional view taken along the line 10—10 of FIG. 9 and looking in the direction of the arrows.
Figure 14:
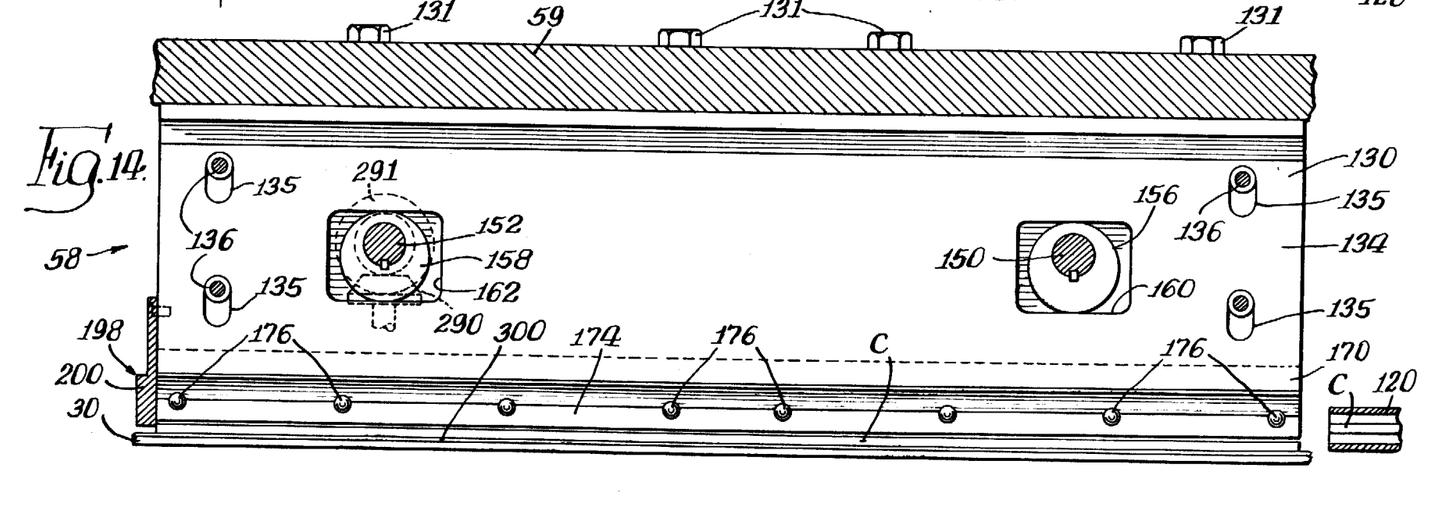
FIG. 14 is a sectional view of the cord laying assembly taken along its longitudinal axis in front of the cord pusher plate and looking rearwardly.
Figures 15, 17:
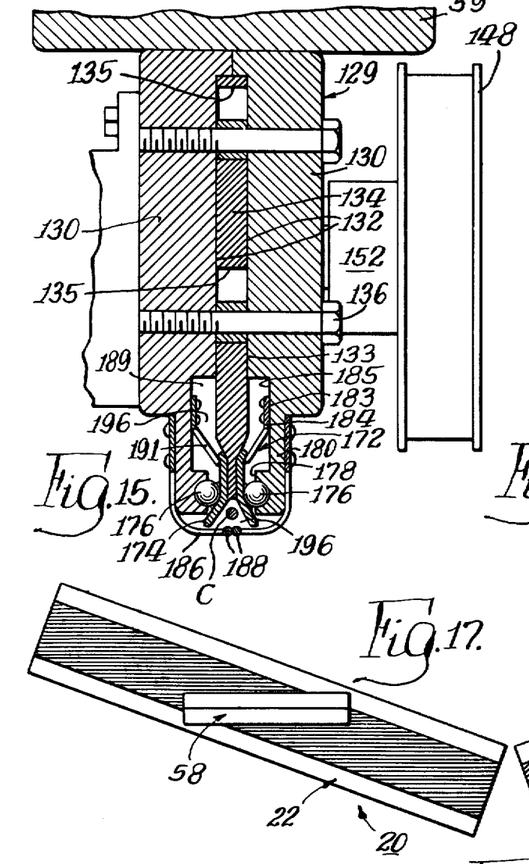
FIG. 15 is a cross sectional view taken along the line 15—15 of FIG. 13 and looking in the direction of the arrows illustrating the position of the parts for the cord laying assembly in the cord releasing position.
FIGS. 17 and 18 are diagrammatic views showing the angular orientation between the work belt assembly and cord laying assembly in applying the first and second breaker layers respectively.
Figures 16, 18:
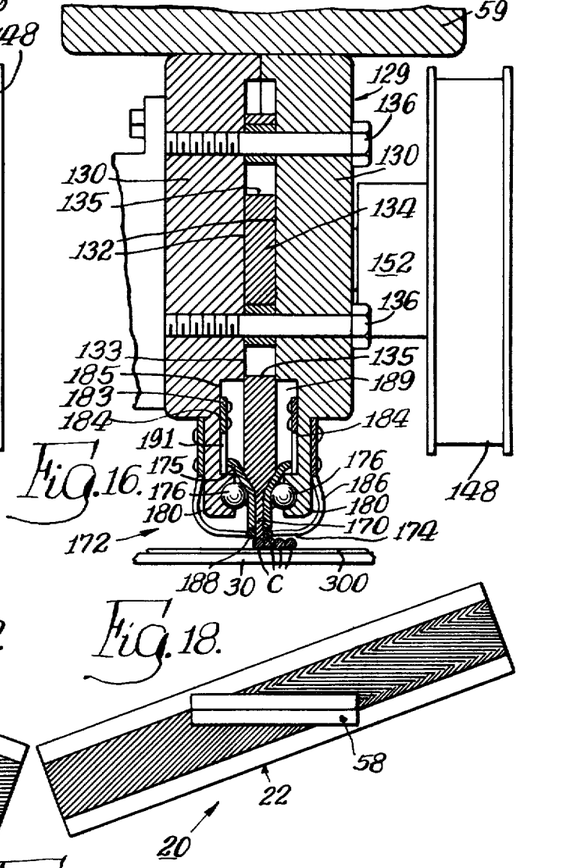
FIG. 16 is the same view as FIG. 15 illustrating the position of the parts for the cord laying assembly in the cord laying position.

As depicted in FIGS. 1 and 2 the cord laying device 58 is supported by the offset middle portion 59 of bridge member 44 and extends generally diagonally across the work belt assembly 22. Referring to FIGS. 10, 15 and 16, the cord laying device is assembled in an elongated housing 129 defined by two elongated plate members 130 held together in a side-by-side relation and supported from the lower surface of the offset middle portion 59 of bridge 44 by means of cap screws 131. The inside lateral surface of the pair of elongated plates 130 are disposed in an abutting relation, and each has a shallow recess 132 formed in the abutting lateral surface to define a guide slot 133 for a pusher plate 134 slidably mounted therein. Vertical guide slots 135 are formed through the pusher plate 134 (FIGS. 13 and 14) at their ends. A cap screw 136 extends through plate members 130 (FIG. 11) and through vertical guide slots 135 to permit the pusher plate 134 to be raised or lowered in a vertical direction by the limits of the slots 135.

Referring to FIG. 1, there is shown the timing belt arrangement for reciprocally driving the pusher plate 134. An endless belt 140 interconnects output drive pulley 142 of the gear box 64 and a first driven pulley 144. A timing belt 146 is trained around the first driven pulley 144 and a second driven pulley 148. An intermediate idler roller 149 provides means for tensioning belt 146 in a conventional manner. The shafts 150 and 152 for the pair of driven pulleys 144 and 148, respectively, are rotatably mounted through circular openings 154 (FIG. 10) provided in the pair of elongated plates 130. A pair of eccentric cams 156 and 158 are keyed to shafts 150 and 152, respectively, and these eccentric cams are contained within square-shaped openings 160, 162 (FIG. 14) respectively, in the pusher plate 134.

The lower end of the pusher plate 134 has a tapered nose portion 170 which cooperates with a cord releasing mechanism 172 to eject the length of cord C from the cord laying device and place it on the work belt. The cord release mechanism 172 includes a pair of rocker plates 174 having a chevron-shape which is secured at the intersection of its wing members 175 to a plurality of rocker bearings 176. The rocker bearings 176 are rotatably seated in pockets formed on the opposing faces 178 of the lower narrowed nose portions 180 of frame plates 130. The upper wings 175 are urged towards each other into engagement with the nose portion 170 by means of a pair of leaf springs 184. Leaf springs 184 have a fixed portion 183 fastened on the sidewall surfaces 185 of a rectangular cavity 189 formed between the nose portions 180 of the plates 130, and a springy portion 191 which engages the upper wings 175 and urges them towards each other.

Figure 13:
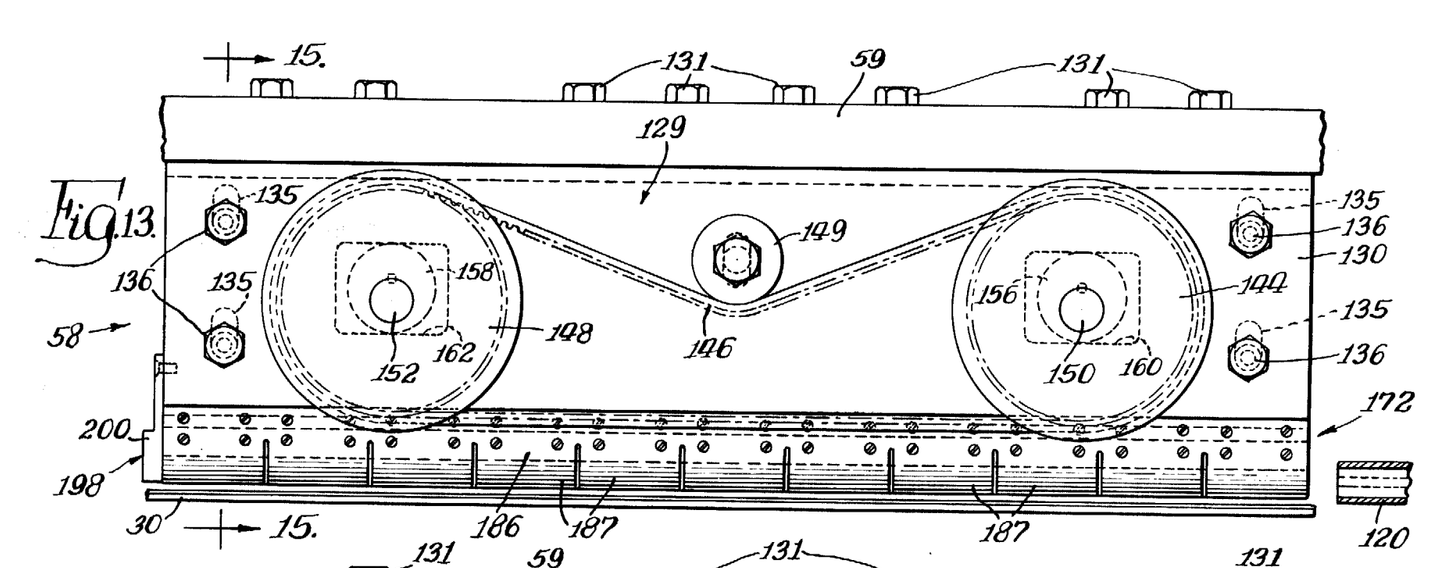
FIG. 13 is a front elevational view of the cord laying assembly.

A pair of cord trap springs 186 is mounted along the outside faces of the lowered nose portion 180 of frame plates 130 and has an inwardly bowed outer end portion which terminates into a pair of beads 188. The parting line between the beads 188 is on the longitudinal axis of pusher plate 134. The spring bias of the cord trap springs 186 is such that the beads 188 are held in normally engaging relation and can be separated upon the downwardly pushing engagement of the cord pusher plate. As shown in FIG. 13, the outward bowed portion of the cord springs 186 are formed as a series of plate segments 187.

When the pusher plate 134 retracts to the upper position, the leaf springs 184 cause the upper wings 175 to come together and thereby form an open ended end enclosure with the cord trap springs closed to define a cord receiving receptacle 196. The venturi tube 120 is in direct alignment with the cord receiving receptacle 196 as depicted in FIG. 15. To center the cut length of cord C within the cord receiving receptacle 196, stop means 198 is provided at the left end of receptacle. Stop means 198 preferably is formed of a magnetic plate 200 connected across the left edge of plates 130, as viewed in FIG. 13, which will magnetically attract the cut length of cord C when made of steel and prevent the cord from rebounding partially out of the receptacle.

To permit the forming of a second layer at a cross bias to the first layer, means are provided for rotatably mounting the work belt assembly 22 on the pedestal 32. A lock screw 200 operated by hand wheel 201 is threadedly mounted through the side wall of pedestal 32 (FIG. 1) and when tightened firmly engages cylinder support 34. By untightening the lock screw 200 it is possible to change the orientation of the work belt assembly 22 relative to bridge 44, such as from the orientation of FIG. 17 to the orientation of FIG. 18.

To make the upper breaker layer of a narrower width and in a centered relation with the lower breaker layer, it is also necessary to provide a means for centering the laying of the top breaker layer over the first breaker layer. Referring to FIGS. 20–23, the means for selectively shifting the L-shaped frame 24 in a radial direction relative to cylindrical support member 34 is shown as a square-shaped stationary block member 204 supported on the top of cylindrical support member 34 and disposed in a rectangular cut-out 206 formed at the midsection of horizontal plate 36 crosswise to its length. An elongated oval slot 210 is provided through the bottom wall 208 of cut-out 206. The head 212 of a bolt 214 secured to the bottom surface of block 204 rides in slot 210 and the threaded shank 216 of bolt 214 is screwed into the threaded aperture 218 extending axially into the upper end of cylindrical support member 34.

Adjustment of the L-shaped frame 24 and associated work belt is provided by displacement of a pair of adjusting screws 220 and 222, which are threadedly mounted in opposed relation at the opposite ends of elongated cut-out 206 and are adapted to engage the opposite ends of stationary block member 204. Adjusting screw 220 is screwed through a threaded opening formed in vertical plate 28, and adjusting screw 222 is screwed through threaded hole formed through the center of end plate 224 which spans across the outer end of cut-out 208 and is fastened by screws 226 on the outer edge of horizontal plate 36. To provide adequate support for L-shaped frame 24 a large shim washer 230 fits over the head 212 of bolt 214 and rests on the upper annular surface of pedestal 32.

Figure 19:
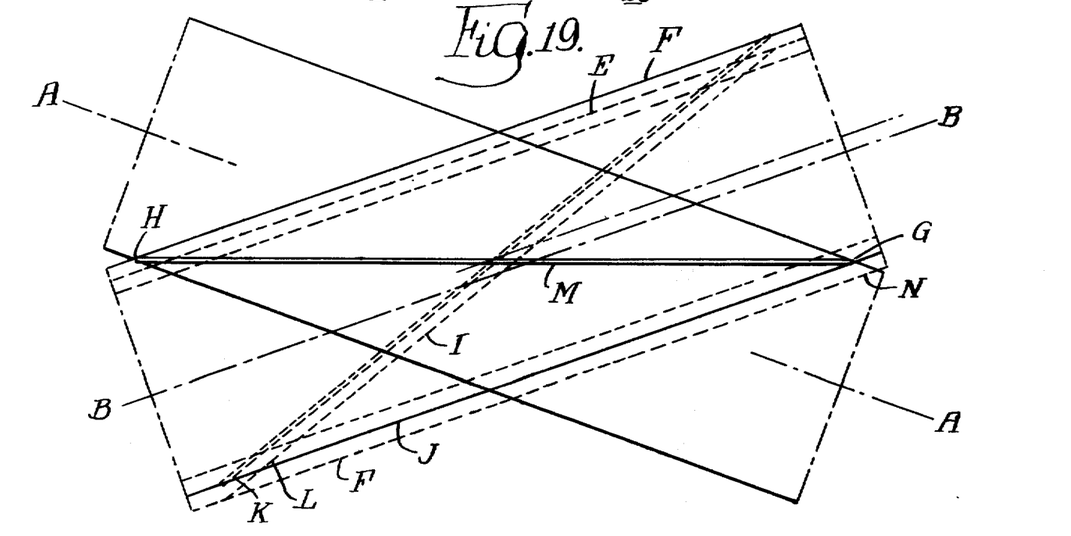
FIG. 19 is a diagrammatic view showing the relative position of the first and second breaker layers with respect to each other and the work belt.
Figure 20:
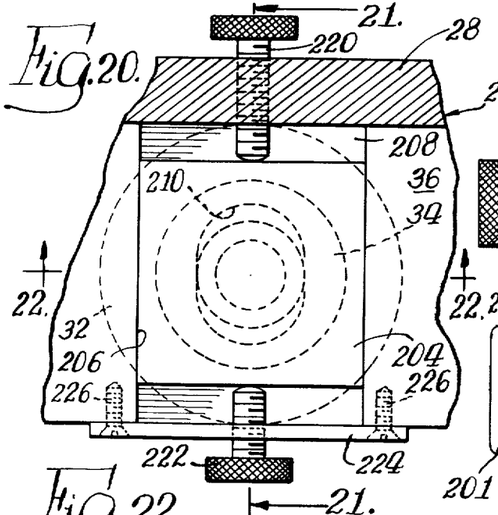
FIG. 20 is a partial cross sectional view of the work belt assembly of FIG. 1 taken along the line 20—20 and looking in the direction of the arrows.
Figure 21:
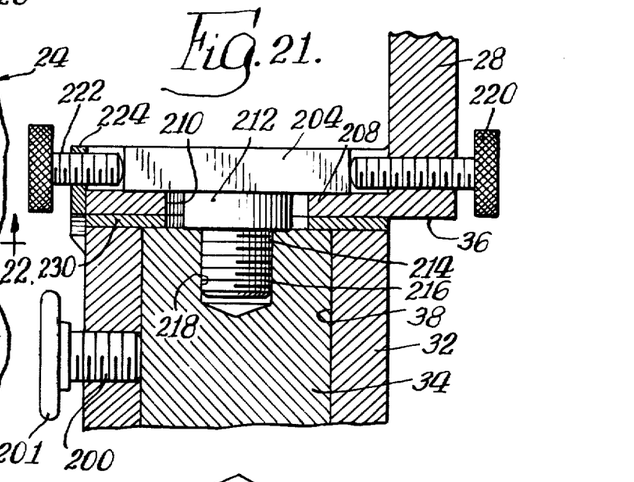
FIG. 21 is a cross sectional view taken along the line 21—21 of FIG. 20 and looking in the direction of the arrows.
Figures 22, 23:
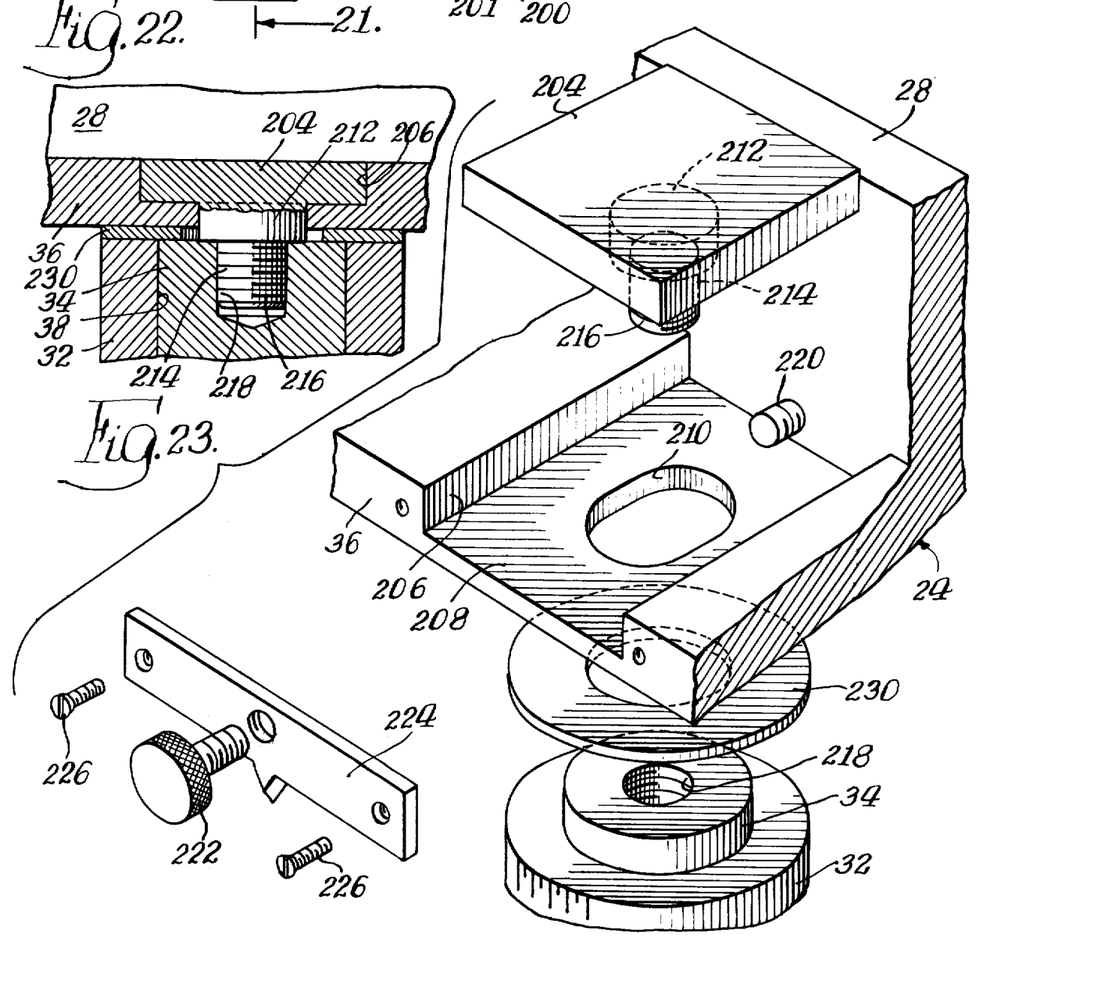
FIG. 22 is a cross sectional view of FIG. 17 taken along the line 22—22 and looking in the direction of the arrows.
FIG. 23 is an exploded view of the parts which when assembled together laterally and rotatably support the work belt assembly.

To set the machine 20 for applying the second or top breaker layer the operator must do three operations: (1) change the angular orientation of the work belt relative to the cord laying assembly, (2) adjust the metering assembly 52 to shorten the length of cord segments fed to the cord laying assembly, and (3) move the L-shaped frame 24 laterally a small distance to center the top layer relative to the first layer. FIG. 19 shows the geometric relationship between the top and bottom breaker layers, where the line A—A is the center line of the first or wider breaker layer and the line B—B is the center line of the second or narrower breaker layer. The other lettered lines on FIG. 19 represent the following:

E — Edge of wide layer of breaker before belt has been laterally moved for application of the top breaker.

F — Edge of wide breaker after belt has been laterally moved for application of the top breaker.

G — End of cord in top layer of breaker.

H — End of cord in both layers of breaker. End of cord in wide breaker before rotation. End of cord in top breaker as it is laid.

I — Cord in wide breaker after rotating to receive top breaker.

J — Edge of wide breaker after belt has been laterally moved to receive top breaker.

K — Wide breaker cord line after belt has been laterally moved to receive top breaker.

L — Wide breaker cord line before belt has been laterally moved to receive top breaker.

M — Represents cord in wide breaker as made belt is then rotated and N then represents right edge of wide breaker before belt has been moved laterally.

Figure 11:
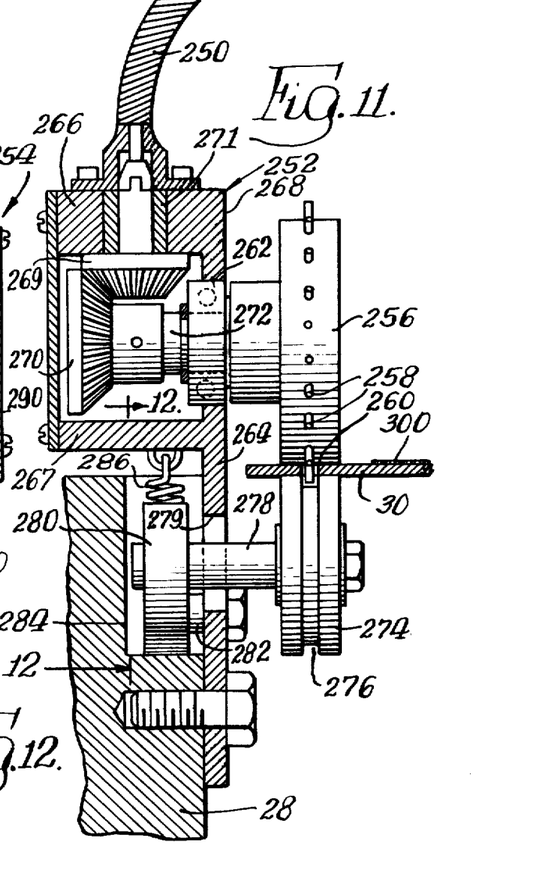
FIG. 11 is a cross sectional view taken along the line 11—11 of FIG. 9 and looking in the direction of the arrows.
Figure 12:
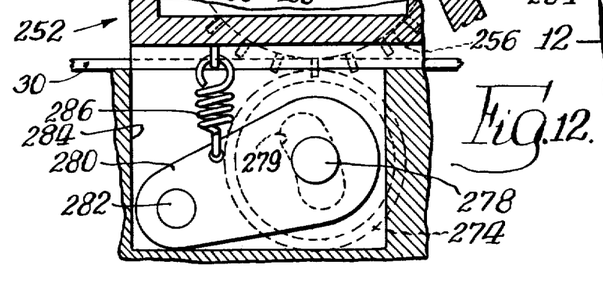
FIG. 12 is a cross sectional view taken along the line 12—12 of FIG. 11 and looking in the direction of the arrows.

To accommodate the rotational and lateral displacement of work belt assembly 22, a flexible shaft 250 interconnects the work belt drive unit 252, which is mounted on vertical wall 28 of L-shaped frame 24, and a bevel gear unit 254, which is supported on the housing for the cord laying assembly 58. Referring to FIGS. 11–12 the work belt drive unit 252 uses a sprocket wheel 256 to advance the work belt by its plurality of radially extending teeth 258 engaging the equally spaced apertures 260 formed in a straight line along one edge of the work belt. Sprocket wheel 256 is rotatably supported by bearing 262 mounted at the upper end of a vertical plate 264 whose lower end is fixed on vertical wall 36 of L-shaped frame 24. A pair of spaced horizontal plates 266, 267 extend away from the upper end of vertical plate 264 to define a housing 268 for a pair of bevel gears 269, 270. Bevel gear 269 is rotatably supported by bushing 271 mounted in plate 266 and is fixed to the end of flexible shaft 250. The other bevel gear 270 is fixed on the inner end of the sprocket wheel shaft 272.

Guide roller 274 (FIG. 12) is disposed below the sprocket wheel 256 to provide a reinforcement of the belt at the point where the sprocket wheel teeth 258 engage the feed apertures 260. As shown in FIG. 11, guide roller 274 has an annular groove 276 into which the teeth 258 project. The shaft 278 for guide roller 274, which projects through arcuate slot 279 in vertical plate 264, is fixed in a normal relation on the free end of an arm 280, which is pivotally mounted by pin 282 fastened to plate 264 and disposed within recess 284 provided in vertical wall 28 adjacent vertical plate 264. A spring 286 constantly urges the pivotal arm upwardly to the position depicted in FIGS. 11–12.

Bevel gear unit 254 (FIG. 10) is constructed of a pair of intermeshing bevel gears 290, 291 in a housing 292 secured to the outside lateral surface of plate 130. Bevel gear 290 is fixed to the other end of flexible shaft 250, and bevel gear 291 is fixed on the outer end of shaft 152.

To construct a breaker, work belt 30 is cemented and a strip of base gum 300 is applied. The end of a spool of cord C is threaded between metering wheel 90 and pressure roller 91, and wrapped one revolution around annular groove 111. Upon starting drive motor 62 the cord C moves past knife 76 into the rear opening 126 of venturi tube 120. The circumference of groove 111 is made equal to the length of the cut length of cord C, and by virtue of fluid drive means 113 can be selectively changed to one of two lengths. The longer length is provided when the fluid is introduced into conduit 119 to move the disc 109 towards disc 108 to the position of FIG. 5. This would be the desired position for making the first breaker layer.

Once each revolution of shaft 73 the arcuate contact 83 (FIG. 7) closes the current path between brushes 85 to energize solenoid 74 and thereby cause plunger 75 and blade 76 to move downwardly severing the cord C. The cut cord segment disposed in venturi tube 120 is then propelled into cord receiving receptacle 196. The propulsion force is sufficient to cause the forward end of the cut cord segment C to strike magnetic plate 200 (FIG. 13) which then magnetically attracts the cord segment to hold it in place.

The cut cord segment C enters the cord receiving receptacle 196 when pusher plate 134 is at the upper end of its stroke. As the pusher plate 134 moves downwardly its nose portion 170 pushes through rocker plates 174, as depicted in FIG. 15. Further downward movement of the pusher plate causes the inward movement of the lower wings 177 of wing members 175 to sweep the cord segment toward the center and finally bring it to rest on the parting line between beads 188. Finally the pusher plate engages the cut cord segment and forces the cord trap springs to separate allowing the cord segment to drop on the gum base 300 (FIG. 16) in an abutting relation to the previously laid cord segment.

Machine 20 continues to lay cord segments on the gum base 300 until a complete layer is made. If a second narrower layer is desired, it is then necessary to operate fluid drive means 113 to move disc 109 away from disc 108 to the position of FIG. 6, and to adjust the work belt assembly 22 laterally to center the laying of the second narrower layer relative to the first layers.

Figure 9:
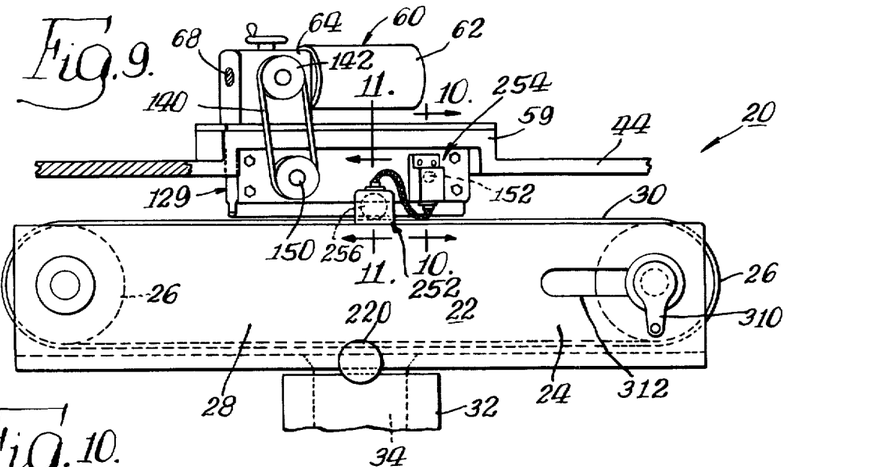
FIG. 9 is a partial rear view of the preferred embodiment of this invention taken along the line 9—9 of FIG. 2.

When the breaker layer is complete the drive motor 62 is deenergized and hand wheel 310 (FIG. 9) is untightened, allowing the left pulley 26 to be shifted towards the right in slot 312 formed in vertical plate 28 of L-shaped frame 24. The belt is then easily lifted off the pulleys and the breaker can then be removed from the work belt 30.

We claim:

1. A machine for forming a tire breaker from a spool of cord comprising an endless work belt, a gum base supported on said work belt, carriage means for supporting and rotating said work belt, single cord feeding means adjacent to the work belt, single cord metering means associated with said single cord feeding means for metering predetermined successive single lengths of cords from the spool, single cord cutting means associated with said single cord metering means for successively severing said successive predetermined lengths of individual cords from said spool, a single cord laying means for receiving successive single cords disposed above and extending diagonally across said work belt, said single cord laying means including means to sequentially lay said individual lengths of single cords in side-by-side relationship on said gum base on said work belt as said work belt is moved in timed relationship under said single cord laying means, said single cord laying means comprising an elongated housing extending diagonally above and across said work belt and having a lengthwise extending cord receiving receptacle above said work belt, a pusher plate slidably mounted above said receiving receptacle and having a nose portion at its lower end, single cord releasing means disposed at the lower end of said receiving receptacle, and drive means for reciprocally moving said pusher plate such that said nose portion actuates said single cord releasing means and places the successive cut lengths of cord onto said gum base supported on said work belt.

2. The machine of claim 1 characterized by said single cord releasing means comprising a pair of elongated single cord trap springs mounted on the lower end of said housing, the free ends of said single cord trap springs being biased together to form a parting line in direct alignment with the center line of said receiving receptacle, said receiving receptacle being formed in part by said free ends of said single cord trap springs, and said single cord releasing means being actuated by said nose portion of said pusher plate to spread apart said free ends of said single cord trap springs, and said single cord cutting means being disposed between said single cord metering means and said single cord feeding means for severing said cord into said predetermined lengths as said pusher plate moves above said single cord receiving receptacle.

3. A combination of claim 1 wherein single cord feeding means comprises a venturi tube adjacent said elongated housing in direct alignment with said single cord receiving receptacle, and means for introducing pressured air into the rear of said venturi tube to propell the cut single cord length in one end of said receptacle upon said cutting means severing the end of said spool of cord.

4. The combination of claim 1 further comprising a magnetic stop means closing off the other end of said single cord receiving receptacle to attract and hold a cut length of cord in a centered position within said single cord receiving receptacle.

5. The combination of claim 1 wherein said carriage means includes an upright pedestal and an elongated frame member pivotally mounted at its center on said pedestal, a pair of spaced apart pulleys rotatably supported on said frame member, said work belt being trained about said pulleys, and centering means for laterally shifting said frame member relative to said upright pedestal to permit centering for the laying of a second breaker layer relative to the first breaker layer in which the second breaker layer has a different width.

6. The combination of claim 1 wherein said single cord metering means include adjustable means for changing the speed of feeding said cord to selectively vary the single cut length of cord.

7. The combination of claim 1, further comprising means for temporarily laterally displacing the path of travel of the end of said spool simultaneously with the severing of a length of cord by said single cord cutting means.

8. The combination of claim 1, wherein said single cord cutting means comprises a solenoid having a blade affixed on its plunger, and switch means for energizing said solenoid when said pusher plate moves above said cord receiving receptacle, said blade being caused to cross the path of travel of said cord when said solenoid is energized.

9. The combination of claim 1, wherein said single cord metering means comprises a feed wheel having an annular groove for receiving one convolution of the cord and a pressure wheel biased toward said annular groove, annular compressible rings disposed in side-by-side relation across said annular groove, and fluid drive means for varying the width of said annular groove to thereby change the effective outer diameter of the compressible rings to selectively change the speed of forwarding the end of said spool of cord to said single cord feeding means.

10. The combination of claim 1, wherein said elongated housing has a lower end portion having a lengthwise extending passageway, bearing receiving pockets formed in opposing surfaces along said passageway, and wherein said single cord releasing means includes a pair of winged-shaped rocker plates, bearing means secured to said rocker plates at their obtuse-angle intersection and rotatably seated in said bearing receiving pockets, and spring means for urging the upper portions of the rocker plates together such that the lower wing portions define with said free ends of said single cord trap springs said single cord receiving receptacle.

* * * * *

UNITED STATES PATENT AND TRADEMARK OFFICE
CERTIFICATE OF CORRECTION

PATENT NO. : 3,894,906

DATED : July 15, 1975

INVENTOR(S) : Thomas H. Pearce and Larry C. Frazier

It is certified that error appears in the above-identified patent and that said Letters Patent are hereby corrected as shown below:

IN THE GRANT (ONLY)

The first page of the patent was missing from the original Letters Patent, as per the attached sheet.

Signed and Sealed this

Tenth Day of August 1976

[SEAL]

Attest:

RUTH C. MASON
Attesting Officer

C. MARSHALL DANN
Commissioner of Patents and Trademarks

United States Patent

Pearce et al.

[11] 3,894,906
[45] July 15, 1975

[54] APPARATUS FOR MAKING TIRE BREAKERS

[75] Inventors: Thomas H. Pearce, Niles, Mich.; Larry C. Frazier, Sun City, Ariz.

[73] Assignee: National-Standard Company, Niles, Mich.

[22] Filed: June 1, 1973

[21] Appl. No.: 366,239

[52] U.S. Cl. ............... 156/440; 28/1 CL; 156/123; 156/126; 156/128 I; 156/128 T; 156/405 P; 156/298; 156/302; 156/304; 156/512; 156/517; 156/519; 56/560; 56/562
[51] Int. Cl.² B29H 9/04; B29H 17/28; B65H 51/00
[58] Field of Search ........ 156/405 P, 123, 133, 126, 156/512, 517, 519, 398, 128, 128 I, 128 T, 264, 265, 440, 560, 562, 296, 297, 298, 302, 304; 28/1 CL

[56] References Cited
UNITED STATES PATENTS

| 1,714,799 | 5/1929 | Midgley | 156/512 |
| 2,231,853 | 2/1941 | MacDonald et al. | 156/512 |
| 3,156,027 | 11/1964 | Wellman | 28/1 CL |
| 3,666,598 | 5/1972 | Christie et al. | 156/361 |
| 3,694,283 | 9/1972 | Cooper et al. | 156/512 |
| 3,802,982 | 4/1974 | Alderfer | 156/128 T |

FOREIGN PATENTS OR APPLICATIONS

| 629,645 | 10/1961 | Canada | 156/128 I |

*Primary Examiner*—Clifton B. Cosby
*Attorney, Agent, or Firm*—Johnson, Dienner, Emrich & Wagner

[57] ABSTRACT

A tire breaker is formed on a continuously rotating work belt by laying a continuous series of cut length of cord in a side-by-side relation until a complete layer is made. The end of a spool of cord is divided into equal-length segments and the segments are fed sequentially to a cord laying means which operates in a timed relation with the continuous advancement of the work belt.

10 Claims, 23 Drawing Figures